United States Patent [19]
Ishihara et al.

[11] Patent Number: 6,081,088
[45] Date of Patent: Jun. 27, 2000

[54] AUTOMATIC OPENING/CLOSING APPARATUS

[75] Inventors: Hidenori Ishihara, Hamamatsu; Noboru Tsuge; Kenji Kato, both of Kariya, all of Japan

[73] Assignees: Asmo Co., Ltd.; Toyota Shatai Kabushiki Kaisha, both of Japan

[21] Appl. No.: 09/216,979

[22] Filed: Dec. 21, 1998

[30] Foreign Application Priority Data

Dec. 26, 1997 [JP] Japan ................................. 9-358997

[51] Int. Cl.⁷ ..................................................... E05F 15/14
[52] U.S. Cl. ........................ 318/466; 318/467; 318/469; 318/468; 49/280; 49/449
[58] Field of Search ................................... 318/260–268, 318/445–468, 282, 565, 469, 283; 49/449, 361, 280, 28, 139, 25, 213, 360; 364/167.01; 187/103, 119, 316, 339, 390

[56] References Cited

U.S. PATENT DOCUMENTS

| | | | |
|---|---|---|---|
| 4,640,050 | 2/1987 | Yamagishi et al. | 49/280 |
| 4,831,509 | 5/1989 | Jones et al. | 364/167.01 |
| 5,069,000 | 12/1991 | Zuckerman | 49/28 |
| 5,131,506 | 7/1992 | Mizuno et al. | 187/103 |
| 5,162,711 | 11/1992 | Heckler | 318/264 |
| 5,539,290 | 7/1996 | Lu et al. | 318/565 |
| 5,592,060 | 1/1997 | Racine et al. | |
| 5,632,120 | 5/1997 | Shigematsu et al. | 49/449 |
| 5,640,807 | 6/1997 | Shigematsu et al. | 49/449 |
| 5,650,698 | 7/1997 | Ito et al. | 318/282 |
| 5,663,620 | 9/1997 | Mizuno et al. | 318/283 |
| 5,689,160 | 11/1997 | Shigematsu et al. | 318/281 |
| 5,723,960 | 3/1998 | Harada | 318/469 |
| 5,780,787 | 7/1998 | Kamani et al. | 187/316 |
| 5,817,993 | 10/1998 | Kamani et al. | 187/316 |
| 5,952,801 | 9/1999 | Boisvert et al. | 318/468 |

FOREIGN PATENT DOCUMENTS

| | | |
|---|---|---|
| 0 686 802 A2 | 12/1995 | European Pat. Off. . |
| 0 772 272 A1 | 5/1997 | European Pat. Off. . |
| 44 16 803 A1 | 11/1994 | Germany . |
| 196 23 420 A1 | 12/1997 | Germany . |
| 9-264094 | 10/1997 | Japan . |
| 9-315157 | 12/1997 | Japan . |
| 2 268 287 | 1/1994 | United Kingdom . |

*Primary Examiner*—Paul Ip
*Attorney, Agent, or Firm*—Parkhurst & Wendel, L.L.P.

[57] ABSTRACT

An automatic sliding door apparatus has a speed-change detecting element for detecting a change in the driving speed of a slide motor above a predetermined value as well as a pressure sensitive sensor disposed in a front end portion of a door panel, and the detecting of a foreign object is effected by the pressure sensitive sensor in regions other than a region in which the door panel slides at a fixed speed. Accordingly, the detecting of a foreign object is made possible in a region where the detecting of a foreign object is difficult in the detection of a change in speed by the speed-change detecting element. Moreover, since the detecting of a foreign object based on a change in speed is not effected in the regions other than the region in which the door panel slides at the fixed speed, it is possible to set to a higher level a reference value in speed change of the speed-change detecting element which determines that the door panel has received a reaction force of pressing from a foreign object in the region where the door panel moves at the fixed speed. The sensitivity can also be enhanced as a result.

28 Claims, 10 Drawing Sheets

AUTOMATIC OPENING/CLOSING APPARATUS

BACKGROUND OF THE INVENTION

1. Field of the Invention

The present invention relates to an automatic opening/closing apparatus such as an electrically-operated sliding door and an electrically-operated sunroof which are used in a vehicle.

2. Description of the Related Art

Among vehicles such as wagons and vans, a type of vehicle is known which adopts a so-called sliding door in which a door panel is opened or closed by being slid in the longitudinal direction of the vehicle.

Among such sliding doors, there is an automatic sliding door apparatus whose opening/closing operation (i.e., the sliding of the door panel) is automated by the driving force of a driving means such as a motor, and which permits an occupant in the driver's seat to perform the opening/closing operation of for example, the door panel beside a rear seat.

In the conventional automatic sliding door apparatus, the detection of the nipping of a foreign object in a case where the door panel has nipped a foreign object at the time of closing the door panel is effected by detecting an overload of a motor accompanying a decline in the sliding velocity of the door panel which occurs due to the nipping of the foreign object by the door panel.

However, in ordinary automatic sliding door apparatuses, the sliding velocity of the door panel is delayed immediately before the full opening or full closing of the door panel so as to prevent vibration and noise during the opening or closing and improve the durability of a weatherstrip and the like provided at the door panel. Since the sliding velocity of the door panel changes immediately before the full opening or full closing of the door panel, the detection of the nipping of a foreign object is impossible in that portion of the opening or closing process. Accordingly, in this portion where the sliding velocity changes, mask processing is generally provided in which even if an overload of the motor is detected, a determination is made that the nipping of a foreign object by the door panel has not occurred, and the region where the sliding velocity of the door panel changes is set as a dead zone. For this reason, if a thin foreign object or a foreign object having a small shape is nipped, it is difficult to detect the nipping.

In addition, when the sliding door apparatus is made to undergo an opening/closing operation in a state in which the vehicle is inclined forward or backward, since the opening/closing velocity of the door panel changes due to the effect of gravity, there is a problem in that it is difficult to ascertain whether or not a foreign object has been really detected by the detection of an overload of the motor in such a case.

SUMMARY OF THE INVENTION

Accordingly, it is an object of the present invention to provide an automatic opening/closing apparatus which is capable of preventing the nipping by detecting a foreign object in a case where the opening/closing movement velocity of a moving member such as a door panel changes and even if the foreign object is small.

To this end, in accordance with a first aspect of the present invention, there is provided an automatic opening/closing apparatus: comprising: a moving member which performs an opening/closing movement by receiving a driving force from a driving means; position detecting means for detecting the position of the moving member; load detecting means for detecting a load on the driving means if the movement of the moving member is restricted when the driving means is in a driving state; a pressure sensitive sensor disposed on the moving member for moving integrally with the moving member which is moved by the driving force of the driving means, and for detecting pressure applied to an end portion in the moving direction of the moving member which is moved by receiving the driving force of the driving means; determining means for determining whether or not a state in which a load of a reference value or greater is detected by the load detecting means is an overloaded state and whether or not a state in which pressure of a reference value or greater is detected by the pressure sensitive sensor is a pressed state; controlling means for controlling the driving of the driving means if it is determined by the determining means that the state is at least one of the overloaded state and the pressed state; and reference-value changing means for changing at least either one of a reference value for determination of the overloaded state by the determining means and a reference value for determination of the pressed state by the determining means, in correspondence with a position of the moving member detected by the position detecting means.

In accordance with the automatic opening/closing apparatus having the above-described configuration, as the moving member is made to perform an opening/closing movement by the driving force of the driving means, a predetermined range is opened or closed by the moving member.

In addition, in the state in which the moving member is performing an opening/closing movement, if the movement of the moving member is restricted by such as the nipping of a foreign object and a load is applied to the driving means, this load is sensed by the load detecting means. Further, the pressure sensitive sensor which moves together with the moving member is brought into contact with the foreign object or the like which is present on the moving path of the moving member, and the pressure sensitive sensor detects the reaction force of pressing (i.e., pressure) from the foreign object when the pressure sensitive sensor has pressed the foreign object.

If the load detecting means has detected the load, and the pressure sensitive sensor has detected the reaction force of pressing, the determining mean determines whether or not the load and the reaction force of pressing are at reference values or greater. If it is determined by the determining means that either one of the load and the reaction force of pressing is at a reference value or greater, the controlling means controls the driving of the driving means, and, for example, stops or drives the driving means in reverse.

Here, in the automatic opening/closing apparatus, the position of the moving member has been detected by the position detecting means, and at least either one of the reference value for determination of the overloaded state by the determining means and the reference value for determination of the pressed state by the determining means is changed in correspondence with the result of this detection. Accordingly, the sensitivity and reliability of detection of the nipping of a foreign object can be improved if either one of the aforementioned reference values is lowered or the other one of the reference values is raised in a region where the detection of a foreign object by either one of the load detecting means and the pressure sensitive sensor is difficult in the range of opening/closing movement of the moving member, or in a region where the detection of a load of a reference value or greater by the load detecting means and the detection of pressure of a reference value or greater by the pressure sensitive sensor can be effected more reliably due to the restriction of movement by the foreign object or the nipping of a foreign object.

It should be noted that the condition whereby the controlling means controls the driving of the driving means may be one in which the determining means determines the state to be the overloaded state or the pressed state (i.e., "OR condition") or one in which the determining means determines the state to be both the overloaded state and the pressed state (i.e., "AND condition").

In addition, the change of a reference value by the reference-value changing means, which is referred to in the present invention, includes not only a change in the setting of the reference value in the determining means, but if a state which is resultantly equivalent to the change of a reference value is obtained even if the reference value is actually not changed, such a case is also included in the change of the reference value referred to in the present invention. Thus, the arrangement for resultantly obtaining a state equivalent to the change of the reference value is also included in the reference-value changing means.

For example, it is possible to cite an arrangement in which the controlling means controls the driving means by ignoring the determination by the determining means when a moving member located at a specific position is detected by the position detecting means. In this arrangement, since the determining means determines whether or not the load detected by the load detecting means and the pressure detected by the pressure sensitive sensor are greater than or equal to predetermined reference values, the change of reference values is actually not performed. However, since the controlling means controls the driving of the driving means by ignoring the determination by the determining means, an effect similar to that of changing the reference value to 0 or infinity is resultantly demonstrated.

As another example, it is possible to cite an arrangement in which the load detecting means and the pressure sensitive sensor are adapted not to perform the detecting of the load and pressure in a case where the moving member is located at a specific position. The fact that the load detecting means and the pressure sensitive sensor are adapted not to detect the load and pressure ensures that the determining means cannot determine the state to be the overloaded state or the pressed state even if the state is actually set in the overloaded state or the pressed state. Therefore, in the same way as the arrangement in which the controlling means controls the driving means by ignoring the determination by the determining means, an effect similar to that of changing the reference value to 0 or infinity is resultantly demonstrated.

Furthermore, the position detecting means in the present invention may be arranged to directly detect the moving member, or may be arranged to indirectly detect the position of the moving member on the basis of such as the amount of driving by the driving means.

In addition, the load detecting means in the present invention may be arranged to directly detect the load on the driving means, or may be arranged to indirectly detect the load on the basis of such as a change in the moving velocity of the moving member, for example.

In accordance with a second aspect of the present invention, in the automatic opening/closing apparatus according to the first aspect of the invention, if it is detected by the position detecting means that the moving member is located outside a predetermined region, the reference-value changing means raises the reference value for sensing the overloaded state.

In accordance with the automatic opening/closing apparatus having the above-described configuration, if the moving member is located outside a predetermined region, and the position detecting means detects this state, the reference-value changing means raises the reference value for determination of the overloaded state by the determining means. For this reason, when the moving member is located outside the predetermined region, the overloaded state becomes difficult to be determined as compared with the case where the moving member is located within the predetermined region. Accordingly, in regions outside the predetermined region, the controlling means basically controls the driving means if the state is determined to be the pressed state (i.e., if the reaction force of pressing is detected by the pressure sensitive sensor).

Accordingly, accurate detection of a foreign object becomes possible and the nipping of a foreign object can be prevented in a state in which the driving force for moving the moving member has been changed from the driving means to another driving source, and in a state in which the case where an overload of a reference value or greater is applied to the driving means and the case where the movement of the moving member is restricted by abutment of the foreign object against the moving member basically do not correspond to each other because the moving velocity of the moving member changes abruptly such as immediately after the start of movement or immediately before termination of the movement of the moving member.

In accordance with a third aspect of the present invention, there is provided an automatic opening/closing apparatus comprising: a moving member which performs an opening/closing movement by receiving a driving force from a driving means; position detecting means for detecting the position of the moving member; load detecting means for detecting a load applied to the driving means if the movement of the moving member is restricted when the driving means is in a driving state; a pressure sensitive sensor disposed on the moving member for moving integrally with the moving member which is moved by the driving force of the driving means, and for detecting pressure applied to an end portion in the moving direction of the moving member which is moved by receiving the driving force of the driving means, the pressure acting in a direction opposite to the moving direction; determining means for determining whether or not a state in which a load of a reference value or greater is detected by the load sensing means is an overloaded state and whether or not a state in which pressure of a reference value or greater is detected by the pressure sensitive sensor is a pressed state; and controlling means for controlling the driving of the driving means if it is detected by the position detecting means that the moving member is located in a predetermined region and if it is determined by the determining means that the state is at least one of the overloaded state and the pressed state, and for controlling the driving of the driving means if it is detected by the position detecting means that the moving member is located outside a predetermined region and if it is determined by the determining means that the state is the pressed state.

In accordance with the automatic opening/closing apparatus having the above-described configuration, as the moving member is made to perform an opening/closing movement by the driving force of the driving means, a predetermined range is opened or closed by the moving member.

In addition, in the state in which the moving member is performing an opening/closing movement, if the movement of the moving member is restricted by such as the nipping of a foreign object and a load is applied to the driving means, the load detecting means detects this load. Further, if the moving member has pressed a foreign object in the same way as the aforementioned nipping of a foreign object, the reaction force of pressing at this time is detected by the pressure sensitive sensor. As for the detected load and reaction force of pressing, a determination is made by the determining means as to whether or not the sensed values are greater than or equal to reference values.

Here, if it is detected by the position detecting means that the moving member is located in the predetermined region, and if it is determined by the determining means that at least one of the load detected by the load detecting means and the reaction force of pressing detected by the pressure sensitive sensor is in the overloaded state or the pressed state of a reference value or greater, then the controlling means controls the driving of the driving means, and stops or drives the driving means in reverse. Thus, in the predetermined region, since the driving means is stopped or driven in reverse if at least one of the load detected by the load detecting means and the reaction force of pressing detected by the pressure sensitive sensor is at the reference value or greater, even a foreign object which is difficult to be detected by either one of the load detecting means and the pressure sensitive sensor can be detected by the other means, so that the nipping of a foreign object can be reliably prevented.

In addition, if it is detected by the position detecting means that the moving member is located outside the predetermined region, and if it is determined by the determining means that reaction force of pressing detected by the pressure sensitive sensor is in the pressed state of a reference value or greater, the controlling means controls the driving of the driving means, and stops or reversely drives the driving means. Namely, in this case, even if the load of the reference value or greater is detected by the load detecting means, unless pressure of the reference value or greater is detected by the pressure sensitive sensor, the controlling means does not control the driving of the driving means. Accordingly, it is possible to prevent the driving means from being stopped or reversely driven in a state in which, for example, a load equivalent to the restriction of movement by a foreign object is applied to the driving means due to a sudden change in the moving velocity of the moving member, such as immediately after the start of movement or immediately before termination of movement of the moving member.

In accordance with a fourth aspect of the present invention, in the automatic opening/closing apparatus according to the second or third aspects of the invention, the range of the predetermined region is set to a range in which the moving member moves at a fixed velocity.

In accordance with the automatic opening/closing apparatus having the above-described configuration, in the range in which the moving member is moved at a fixed velocity by receiving the driving force of the driving means in the range of movement of the moving member, not only when the pressure sensitive sensor has detected the pressure (reaction force of pressing) of a reference value or greater, but if it is determined by the determining means that the load detected by the load detecting means is greater than or equal to the reference value, the driving of the driving means is controlled by the controlling means, and the driving means is stopped or reversely driven.

In other words, in the region where the moving member moves at a fixed velocity, there are few cases where a load other than the load occurring due to the restriction of the movement of the moving member by a foreign object is applied to the driving means. Additionally, even if a load other than the load occurring due to the restriction of the movement of the moving member by a foreign object is detected, the magnitude of that load is smaller than the load occurring due to the restriction of the movement of the moving member by the foreign object, so that that load becomes less than the reference value. Accordingly, the case in which the load of the reference value or greater has occurred and the case in which the movement of the moving member is restricted by the foreign object basically correspond to each other. For this reason, by performing the detection of a foreign object by both the pressure detection by the pressure sensitive sensor and the load detection by the load detecting means in this region, even a foreign object which is difficult to be detected by either one of the load detecting means and the pressure sensitive sensor can be detected by the other means, so that the nipping of a foreign object can be prevented reliably.

DESCRIPTION OF THE PREFERRED EMBODIMENTS

Figure 4:
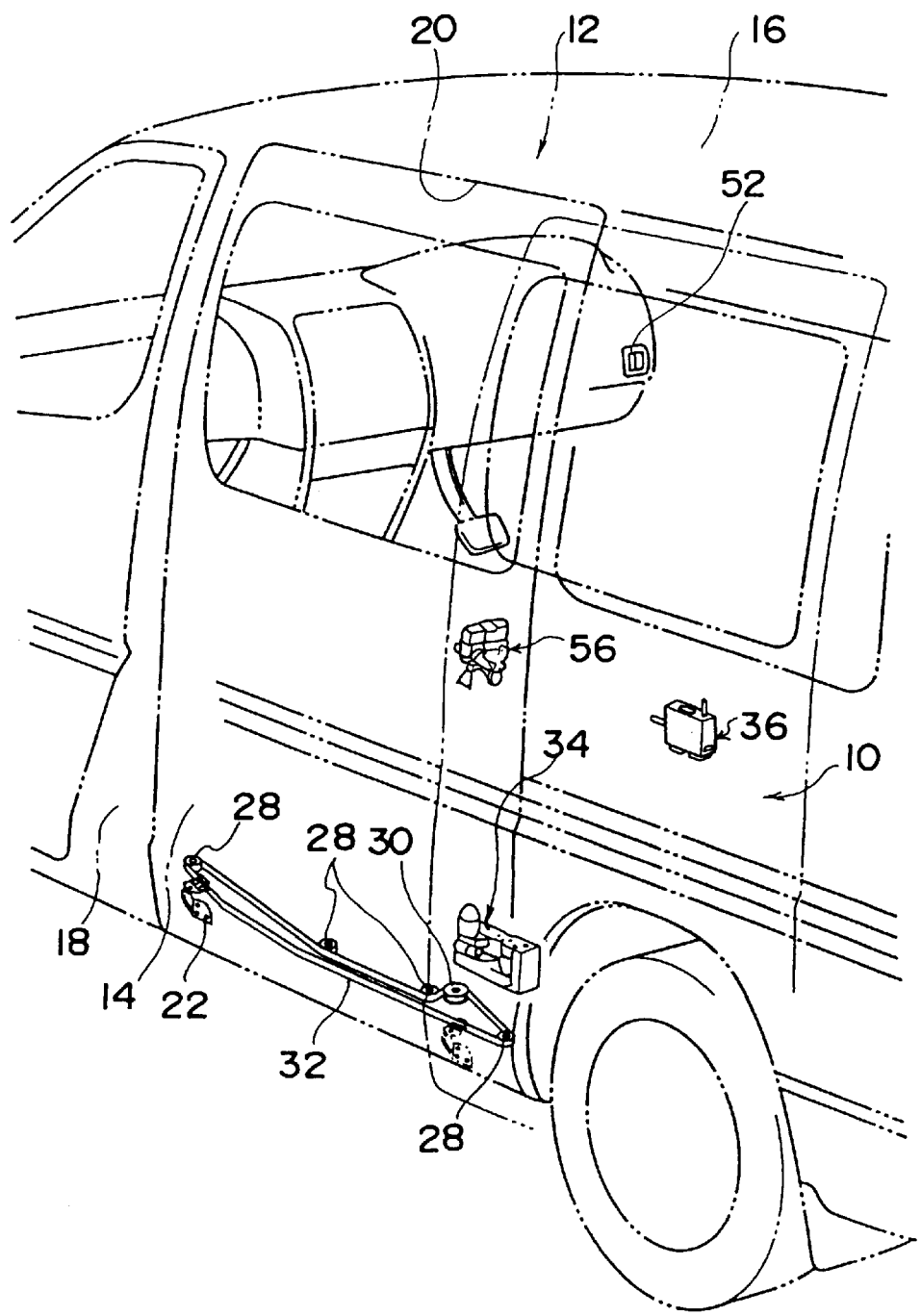
FIG. 4 is a perspective view taken from a diagonally rearward direction of the vehicle.

FIG. 4 shows a perspective view of a vehicle 12 to which is applied an automatic sliding door apparatus 10 as an automatic opening/closing apparatus in accordance with an embodiment of the present invention. As shown in this drawing, the vehicle 12 is provided with a door panel 14 serving as a moving member. This door panel 14 is formed in correspondence with an opening 20 formed in a side wall 18 of a vehicle body 16 for the alighting and boarding of occupants. The door panel 14 is formed such that in a state in which it is fitted in the opening 20 to close the opening 20, an outer surface of the door panel 14 and an outer surface of the side wall 18 are substantially flush with each other.

Figure 6:
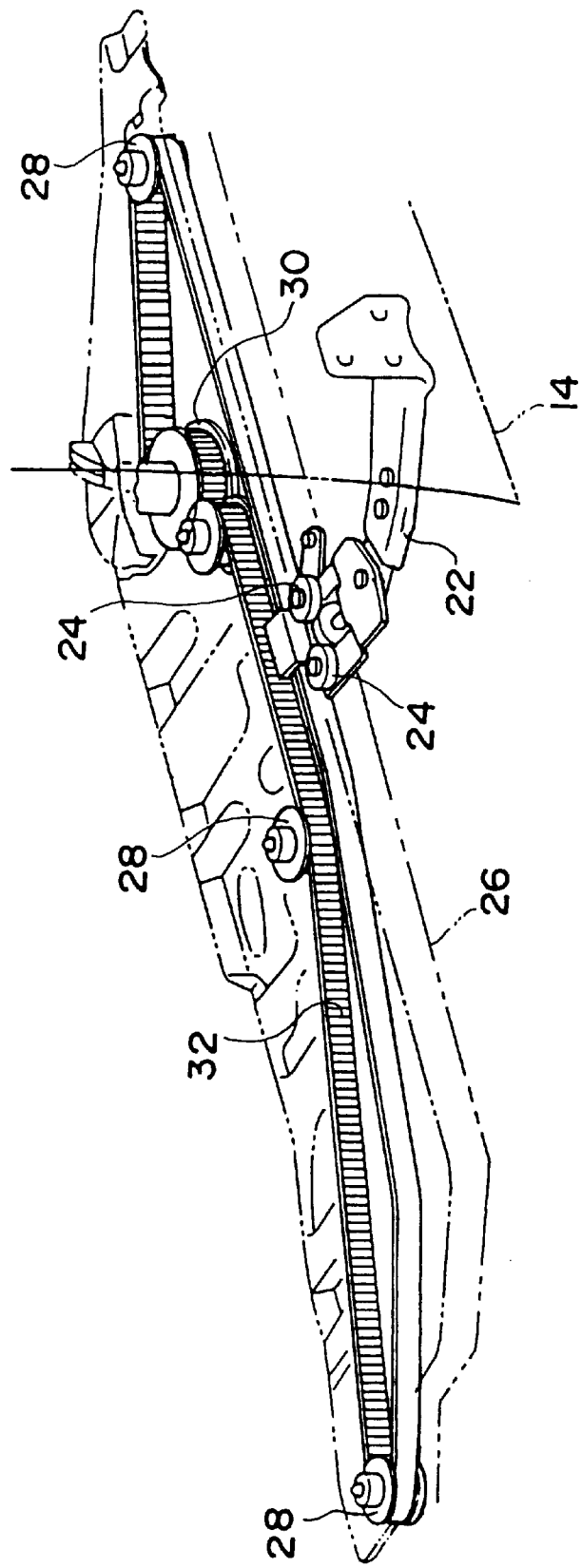
FIG. 6 is a perspective view illustrating a mechanism for sliding a door panel.

A bracket 22 extending in a transversely inward direction of the vehicle is integrally fixed to a lower end of the door panel 14. As shown in FIG. 6, a pair of rollers 24 are pivotally supported at a distal end of the bracket 22, and the rollers 24 abut against the outer surface in the transverse direction of the vehicle of a guide rail 26 provided on a rear surface of a floor panel (not shown) of the vehicle 12. The rollers 24 are movable substantially along the longitudinal direction of the vehicle 12 while being rolled by the friction with the guide rail 26. However, as shown in FIG. 6, an outer end portion in the transverse direction of the vehicle of the guide rail 26 at its forward end is inclined toward the transversely inward side of the vehicle, and as the rollers 24 roll along this inclined portion, the rollers 24 move toward the transversely inward side of the vehicle while moving towards the front of the vehicle 12. Hence, the door panel 14 which was sliding along the longitudinal direction of the vehicle 12 on the vehicle transversely outward side is displaced toward the vehicle transversely inward side, and is fitted in the opening 20. Meanwhile, as the rollers 24 move toward the vehicle transversely outward side while moving towards the rear of the vehicle 12, the door panel 14 which was fitted in the opening 20 is able to move toward the vehicle transversely outward side of the side wall 18, and becomes slidable in the longitudinal direction of the vehicle 12.

In addition, as shown in FIG. 6, pulleys 28 and a drive roller 30, which respectively rotate about axes oriented in the vertical direction of the vehicle 12, are disposed in the vicinities of the guide rail 26, and an endless belt 32 is trained around them. The aforementioned bracket 22 is fixed to the endless belt 32, and when the bracket 22 is moved by the rotation of the endless belt 32, the rollers 24 are adapted to roll along the guide rail 26, which in turn causes the door panel 14 to move.

Figure 2:
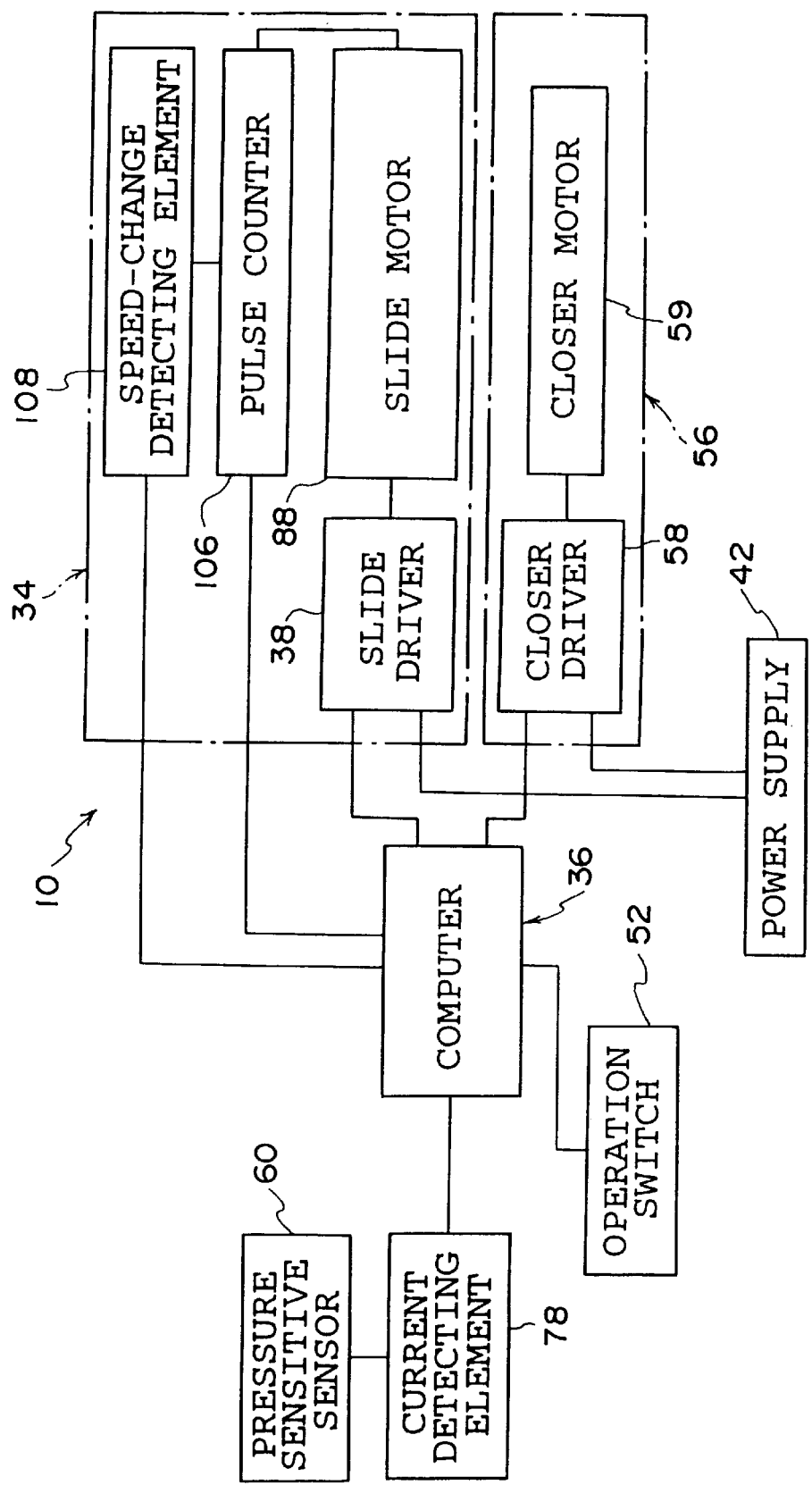
FIG. 2 is a block diagram illustrating the configuration for controlling the driving of the automatic opening/closing apparatus in accordance with the embodiment of the present invention.

The drive roller 30 is connected to a slide actuator 34 shown in FIG. 4, and the endless belt 32 is rotated by the driving force of a slide motor 88 (see FIG. 2), which serves as a driving means provided in the slide actuator 34. Further, as shown in FIG. 2, the slide actuator 34 has a slide driver 38 constituting a part of a controlling means. The slide motor 88 is electrically connected to a computer 36, which constitutes another part of the controlling means, via the slide driver 38. The slide motor 88 is also electrically connected to an operation switch 52 (see FIG. 4), which is disposed in the vicinity of a driver's seat of the vehicle 12, via the computer 36. As a predetermined signal is transmitted to the computer 36 by operating the operation switch 52, the slide actuator 34 is actuated or stopped, thereby making it possible to open or close the door panel 14.

Figure 7:
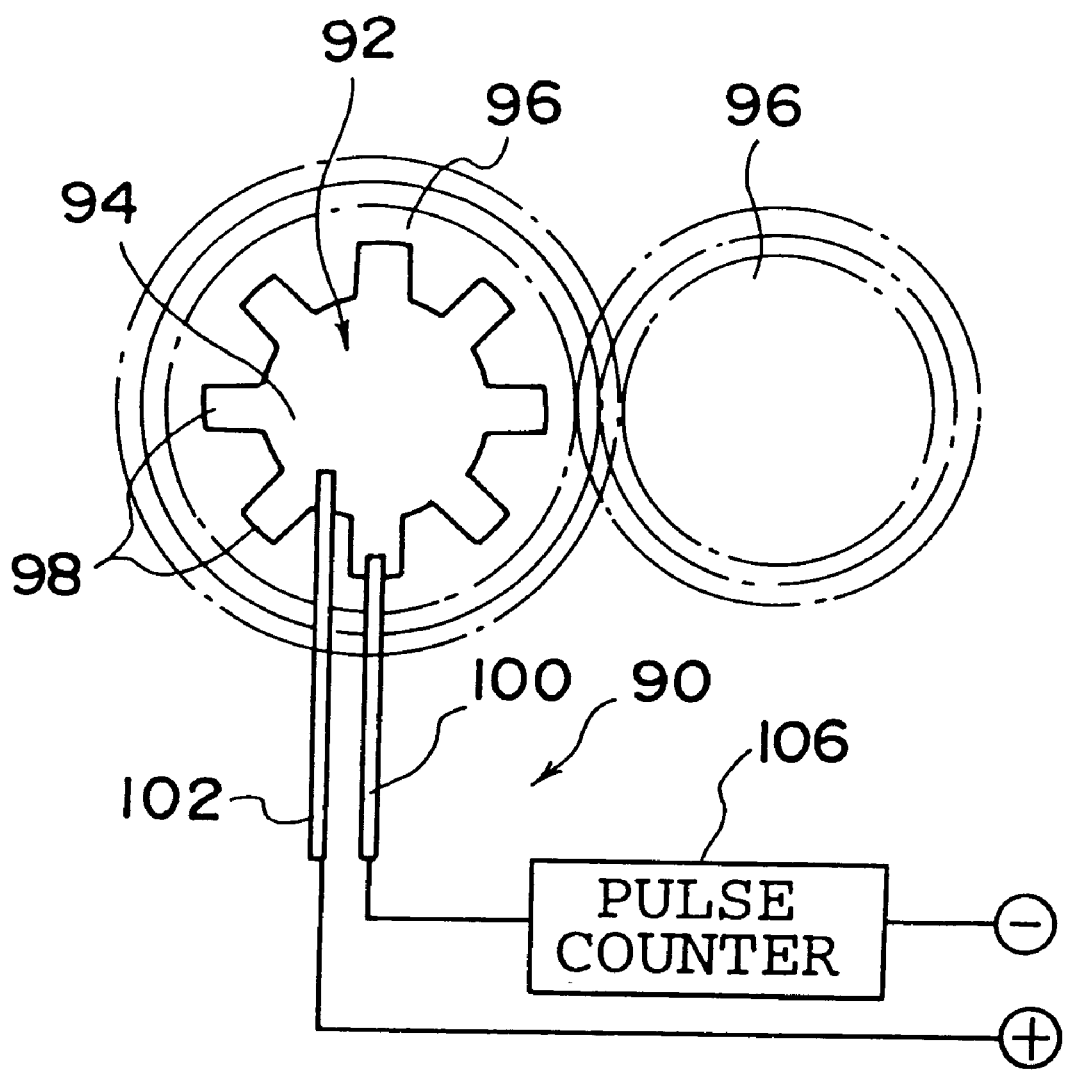
FIG. 7 is a diagram illustrating a schematic arrangement of a position detecting means.

The slide actuator 34 has a position detector 90 serving as a position detecting means and shown in FIG. 7. As shown in FIG. 7, the position detector 90 has a pulse plate 92 which is formed of an electrically conductive sheet member. A substantially disk-shaped disk portion 94 is formed in the pulse plate 92. The disk portion 94 is concentrically and integrally affixed to one of a plurality of gears 96 for transmitting the driving force of the slide motor 88 to the drive roller 30 while decelerating the rotating speed of the slide motor 88 so as to rotate the drive roller 30. Further, a contact plate 102 is held in sliding contact with the disk portion 94 on one axial end thereof. In addition, a plurality of projections 98 are formed on an outer peripheral portion of the disk 94 in such a manner as to project radially therefrom at predetermined angular intervals.

A distal end of a contact plate 100 is positioned on the rotational path of these projections 98. When the pulse plate 92 rotates together with the gear 96 and one of the projections 98 is opposed to the distal end of the contact plate 100, the projection 98 and the contact plate 100 come into contact with each other and are brought into conduction, thereby allowing the contact plate 100 to be conductive with the contact plate 102 via the pulse plate 92.

Proximal ends of the contact plates 100 and 102 are electrically connected to a power supply, and electricity flows only in the aforementioned conductive state. Accordingly, when the gear 96 rotates, electricity flows intermittently, and the voltage at that time is a pulse voltage. The number of pulses (i.e., the number of conductions) of the pulse voltage is counted by a pulse counter 106 provided between the contact plate 100 and the power supply. As shown in FIG. 2, the pulse counter 106 is connected to the computer 36. The computer 36 calculates the position of the door panel on the basis of the number of pulses counted by the pulse counter 106.

Namely, the amount of movement of the door panel 14 is proportional to the amount of rotation of the slide motor 88. Since the amount of rotation of the slide motor 88 naturally is proportional to the amount of rotation of the gear 96, it is possible to detect the position of the door panel 14 by detecting the amount of rotation of the gear 96. Since the projections 98 of the pulse plate 92 are formed at predetermined angular intervals as described above, if the number of conductions between the contact plate 100 and the projections 98, i.e., the number of pulses, after starting the driving of the slide motor 88 is counted, it is possible to calculate the angle of rotation of the gear 96. On the basis of the angle of rotation of the gear 96, it is possible to calculate the amount of rotation of the slide motor 88 and, hence, the amount of movement of the door panel 14 (i.e., the position of the door panel 14).

As shown in FIG. 2, the slide actuator 34 has a speed-change detecting element 108 serving as a load detecting means and a determining means. The speed-change detecting element 108 is adapted to output a signal upon detecting a change in the number of revolutions occurring when the driving of the slide motor 88 is hampered. The outputted signal is inputted to the computer 36.

Figure 5:
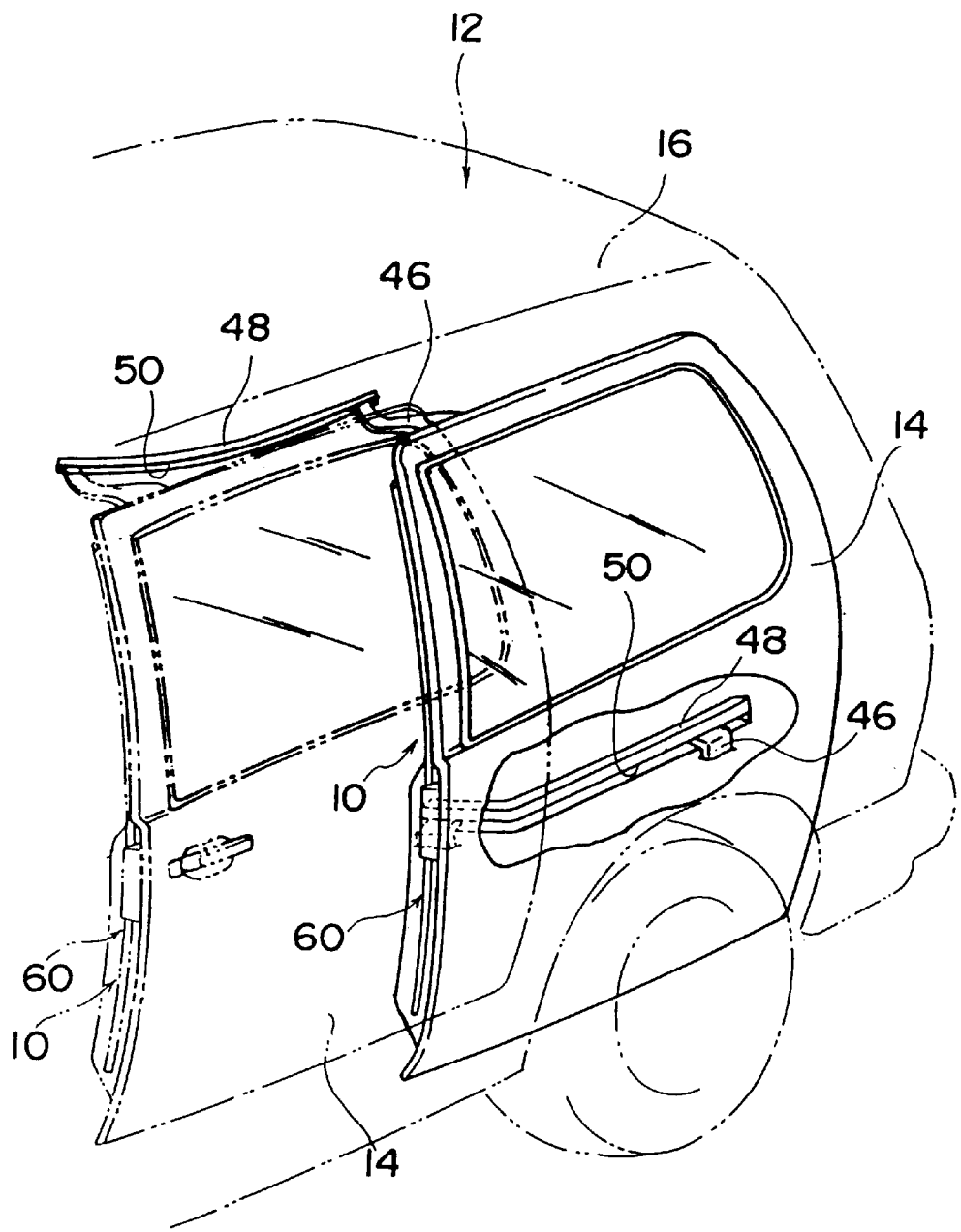
FIG. 5 is a perspective view taken from a diagonally forward direction of the vehicle.

Meanwhile, as shown in FIG. 5, brackets 46 extending in the transversely inward direction of the vehicle are disposed in a vertically intermediate portion and an upper end portion of the door panel, respectively. Rollers (not shown) are provided at distal ends of these brackets 46, and are respectively fitted in guide grooves 50 of guide rails 48, which are disposed at appropriate positions in the vehicle 12, in a state of being prevented from coming off the guide grooves 50 of the guide rails 48, and the rollers are adapted to move along the guide rails 48. Namely, the door panel 14 is supported by the side wall 18 of the vehicle body 16 via the guide rails 48 and the brackets 46, and is moved by the driving force of the aforementioned slide actuator 34 while being guided by the guide rails 26 and 48.

The guide rails 48 at their forward ends are also inclined toward the transversely inward side of the vehicle. In these inclined portions, the rollers 48 move toward the transversely inward side of the vehicle while moving toward the forward side of the vehicle 12 along the guide grooves 50 of the guide rails 48, or move toward the transversely outward side of the vehicle while moving toward the rearward side of the vehicle 12. During this movement, the door panel 14 moves in the transversely inward or outward direction of the vehicle.

In addition, as shown in FIG. 4, the automatic sliding door apparatus 10 is provided with a closer actuator 56 serving as the driving means. The closer actuator 56 is disposed inside the door panel 14 and has a closer motor 59. As shown in FIG. 2, the closer motor 59 is electrically connected to the computer 36 via a closer driver 58 constituting another part of the controlling means. When the pulse counter 106 of the position detector 90 counts the number of revolutions of the slide motor 88 until immediately before the door panel 14 completely closes the opening 20 (full closing), the computer 36 operates the closer driver 58 to supply electric power from a power supply 42 to the closer motor 59 serving as the driving means, and the closer motor 59 is thereby driven. As a result, when the door panel 14 is fitted in the opening 20, the closer motor 59 actuates a lock mechanism (not shown) of the door panel 14, such as a latch, provided in the door panel 14, and leads the door panel 14 to a predetermined position inside the opening 20 where the door panel 14 can be locked by the lock mechanism.

Namely, with this automatic sliding door apparatus 10, the sliding movement (i.e., the opening/closing movement) of the door panel 14 is basically effected by the slide motor 88 (slide actuator 34), but the sliding movement only immediately before the full closing of the door panel 14 is effected by the closer motor 59 (closer actuator 56).

Figure 8:
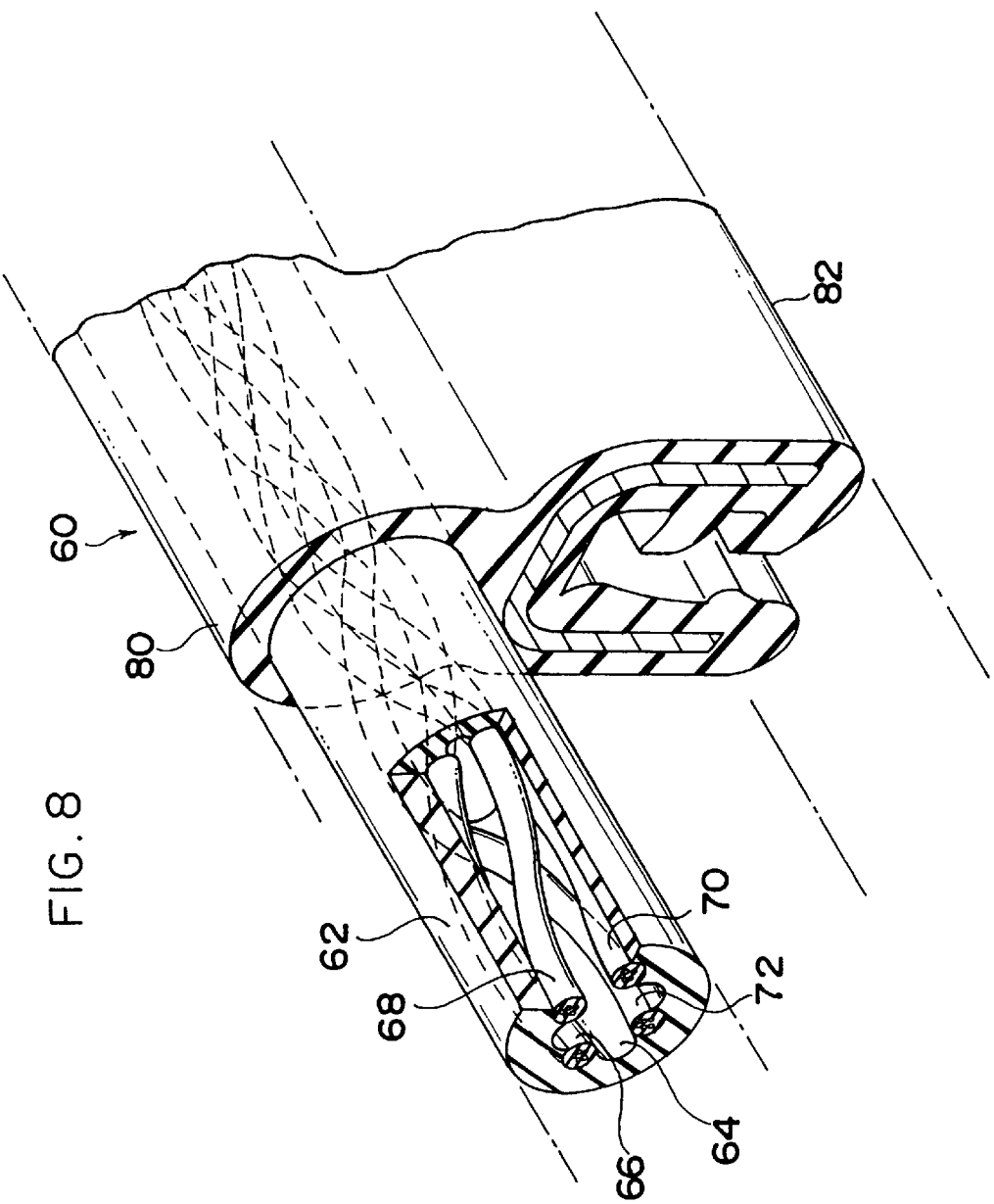
FIG. 8 is a diagram illustrating a schematic arrangement of a pressure sensitive sensor.
Figure 9:
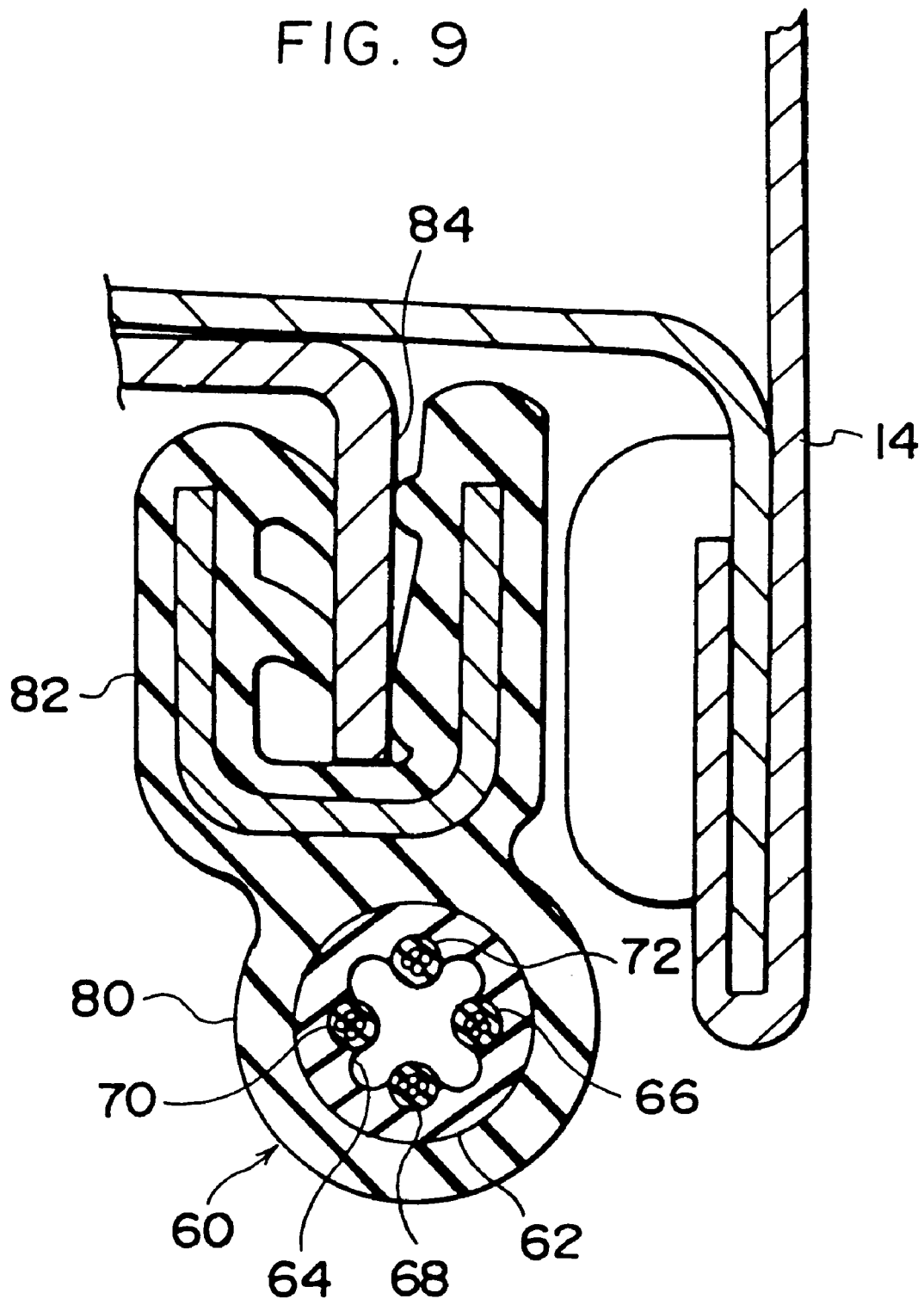
FIG. 9 is a cross-sectional view of the pressure sensitive sensor in a mounted state.

Further, as shown in FIG. 5, a pressure sensitive sensor 60 with its longitudinal direction set in the vertical direction of the vehicle 12 is disposed in the vicinity of the front end of the door panel 14. As shown in FIG. 8, the pressure sensitive sensor 60 has an outer covering portion 62 which constitutes a part of a sensor body and is formed in an elongated shape from a resilient material having insulating properties, such as rubber or a soft synthetic resin material. A cross hole 64 having a cross sectional shape (see FIG. 9) is formed inside the outer covering portion 62 in such a manner as to extend along the longitudinal direction of the outer covering portion 62. The cross hole 64 is gradually displaced about the center of the outer covering portion 62 along the longitudinal direction of the outer covering portion 62. In addition, disposed on the inner side of the outer covering portion 62 are electrodes 66, 68, 70, and 72 which are each formed in the shape of an elongated flexible string by intertwining fine conductive wires such as copper wires, and which constitute the sensor body together with the outer covering portion 62. These electrodes 66, 68, 70, and 72 are disposed helically along the cross hole 64 in such a manner as to be spaced apart from each other through the cross hole 64 in the vicinities of the center of the cross hole 64, and are integrally secured to inner peripheral portions of the cross hole 64. Accordingly, as the outer covering portion 64 undergoes elastic deformation, the electrodes 66, 68, 70, and 72 are deflected. In particular, if the outer covering portion 62 is elastically deformed to the extent that the cross hole 64 is crushed, arbitrary ones or all of the electrodes 66, 68, 70, and 72 come into contact with each other and become conductive. On the other hand, if the outer covering portion 64 is restored, the electrodes 66, 68, 70, and 72 are also restored.

Figure 10:
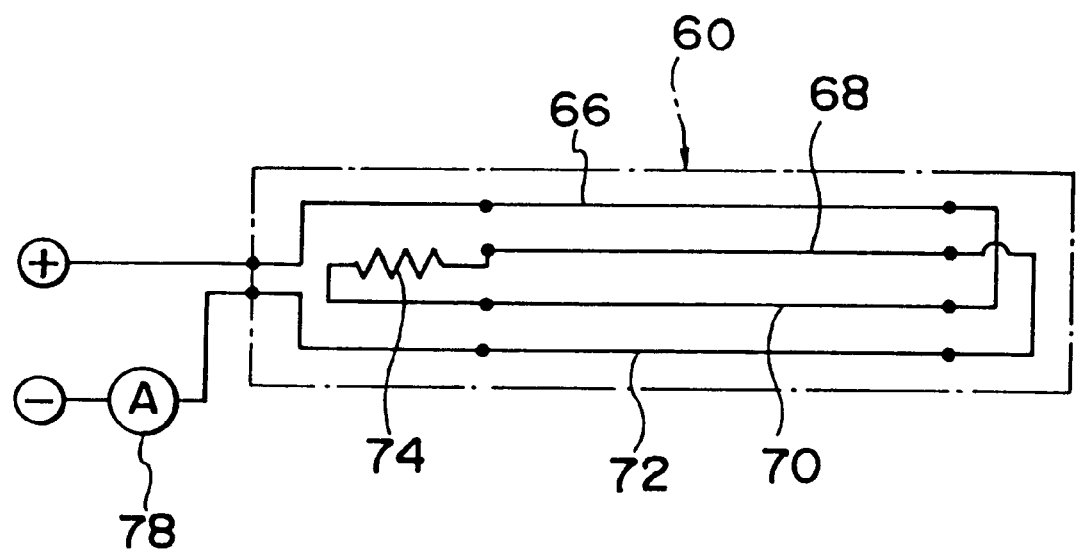
FIG. 10 is a circuit diagram illustrating the configuration of the pressure sensitive sensor.

As shown in a circuit diagram in FIG. 10, the electrodes 66 and 70 at one of their longitudinal ends are conductive with each other, while the electrodes 68 and 72 at one of their longitudinal ends are also conductive with each other. Further, the electrodes 70 and 68 at the other of their longitudinal ends are conductive with each other via a resistor 74. Furthermore, the other of the longitudinal ends of the electrodes 66 and 72 are connected to the power supply via a cord (not shown). However, only the electrode 72 is connected to the power supply via a current detecting element 78 serving as the determining means for outputting a signal when a current of a predetermined value or greater flows across it. Namely, the current which flows from the electrode 66 to the electrode 72 via the electrodes 68 and 70 normally flows through the resistor 74; however, if the outer covering portion 62 is crushed and the electrode 66 or 70 comes into contact with the electrode 68 or 72 and is shortcircuited, the current flows without flowing across the resistor 74. Therefore, for example, if a current is allowed to flow across the circuit at a fixed voltage, the current value changes and the current flowing across the circuit increases. When the current increases and a signal is outputted from the current detecting element 78, it is possible to detect whether or not the outer covering portion 62 has been crushed, i.e., whether or not an external force has been applied to the pressure sensitive sensor 60.

As shown in FIG. 2, the current detecting element 78 is connected to the computer 36.

Figure 1:
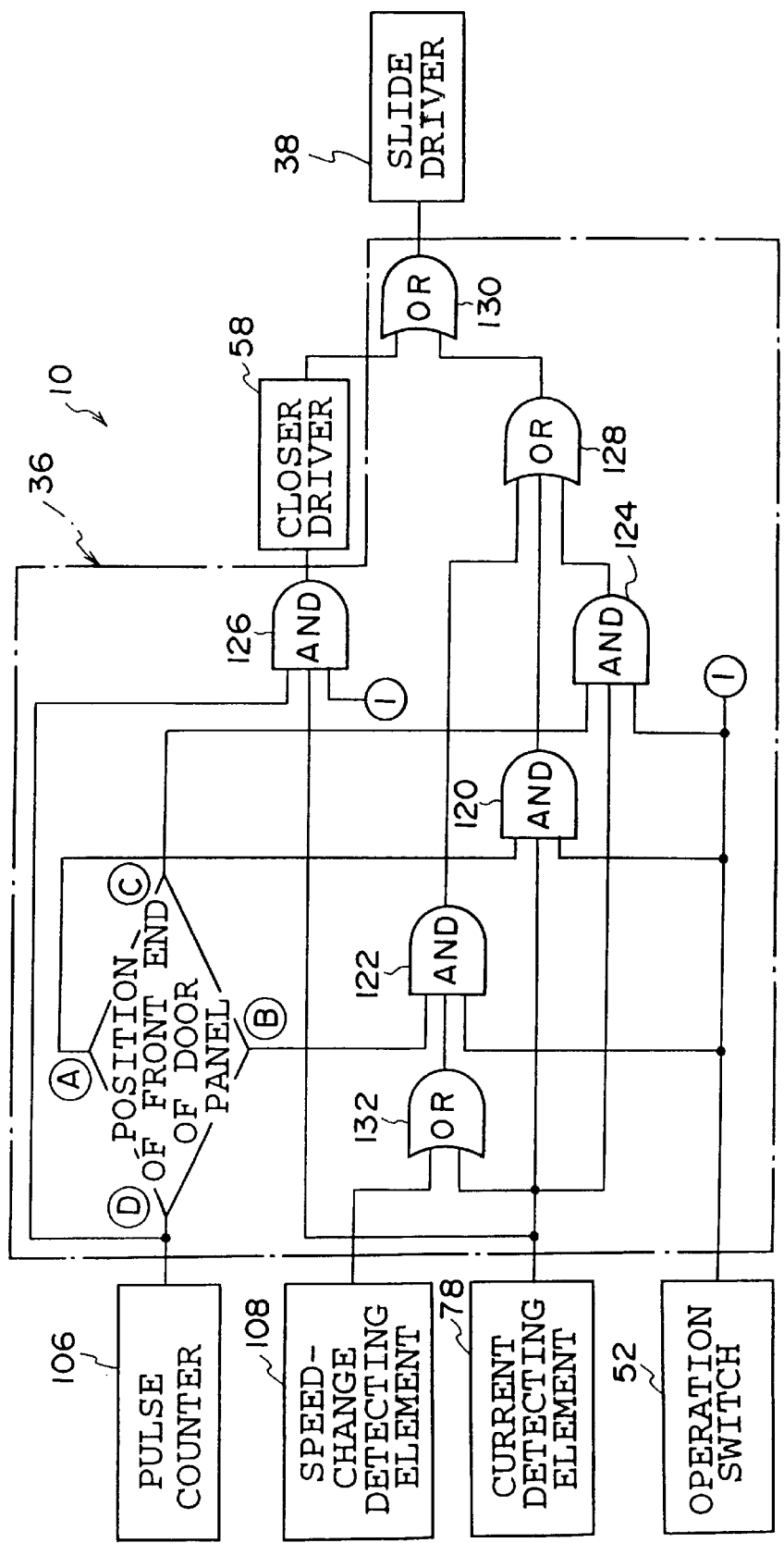
FIG. 1 is a logical circuit diagram for controlling the driving of an automatic opening/closing apparatus in accordance with an embodiment of the present invention.

FIG. 1 shows a logical circuit for controlling the driving of the door panel by the computer 36. As shown in this diagram, the logical circuit for controlling the driving of the door panel is configured by a plurality of AND gates 120, 122, 124, and 126 and a plurality of OR gates 128, 130, and 132. Although the details will be described later, when the door panel 14 is moved in the closing direction from the fully open state, by means of these AND gates 120, 122, 124, and 126 and the OR gates 128, 130, and 132, a condition for reversing the slide motor 88 from the closing drive (i.e., for effecting the opening drive) changes depending on in which one of regions A to D in FIG. 3 the front end portion of the door panel 14 is located.

In addition, as shown in FIG. 8, an elongated protector 80 formed of rubber or a soft and elastically deformable synthetic resin material is provided on the outer side of the outer covering portion 62. The protector 80 holds the outer covering portion 62 in a wrapped state. Further, a holding portion 82 is formed in the protector 80. The holding portion 82 has a U-shape which is open in the rearward direction of the vehicle 12. The pressure sensitive sensor 60 is fixed to the door panel 14 by mounting the holding portion 82 in such a manner as to nip a plate-shaped mounting portion 84 disposed on the inner side of the door panel 14.

Next, a description will be given of the operation and effect in accordance with this embodiment.

In this automatic sliding door apparatus 10, if the operation switch 52 is operated in a state in which the opening 20 is closed by the door panel 14, and if the slide actuator 34 is driven, the drive roller 30 rotates to rotate the endless belt 32, and the endless belt 32 pulls the bracket 22 in the rearward direction of the vehicle 12, which in turn causes the rollers 24 to move along the guide rail 26, while the rollers (not shown) of the brackets 46 also concurrently move along the guide rails 48. Consequently, the door panel 14 slides in the rearward direction of the vehicle 12. Here, since the vehicle body 16 and the guide rails 48 at their front end portions are curved toward the transversely inward side of the vehicle 12, the rollers 24 of the bracket 22 and the rollers of the brackets 46 temporarily move toward the transversely outward side of the vehicle when moving in the rearward direction. As a result of this movement toward the transversely outward side of the vehicle, the door panel 14 comes to be located outwardly of the vehicle body 16 and is, in this state, capable of sliding in the rearward direction along the vehicle body 16.

Meanwhile, if the operation switch 52 is operated in a state in which the opening 20 is open after movement of the door panel 14, and if the slide actuator 34 is driven, the drive roller 30 rotates in a direction opposite to the direction at the time of opening the door panel 14, thereby rotating the endless belt 32. The endless belt 32 pulls the bracket 22 in the forward direction of the vehicle 12. Consequently, the door panel 14 slides in the forward direction of the vehicle 12. In this case, when the slide motor 88 starts driving, the number of conductions between the contact plates 100 and 102 is counted by the pulse counter 106. On the basis of this count, the amount of rotation of the slide motor 88, i.e., the position of the door panel 14, is detected by the computer 36. Then, the door panel 14 moves toward the transversely inward side of the vehicle 12 along the curves of the vehicle body 16 and the guide rails 48, and if the number of revolutions of the slide motor 88 until the door panel 14 assumes a state persisting immediately before fully closing the opening 20 is counted by the pulse counter 106, the computer 36 operates the closer driver 58 of the closer actuator 56 to supply electric power from the power supply 42 to the closer motor 59. As a result, the closer motor 59 starts driving. The closer motor 59 actuates the lock mechanism for locking the door panel 14 with the opening 20 fully closed, and leads the door panel 14 to a position where the door panel 14 can be locked by the lock mechanism. Consequently, when the door panel 14 fully closes the opening 20, the lock mechanism locks the door panel 14, thereby restricting the movement of the door panel 14 in the opening direction unless a predetermined opening operation is provided.

Figure 3:
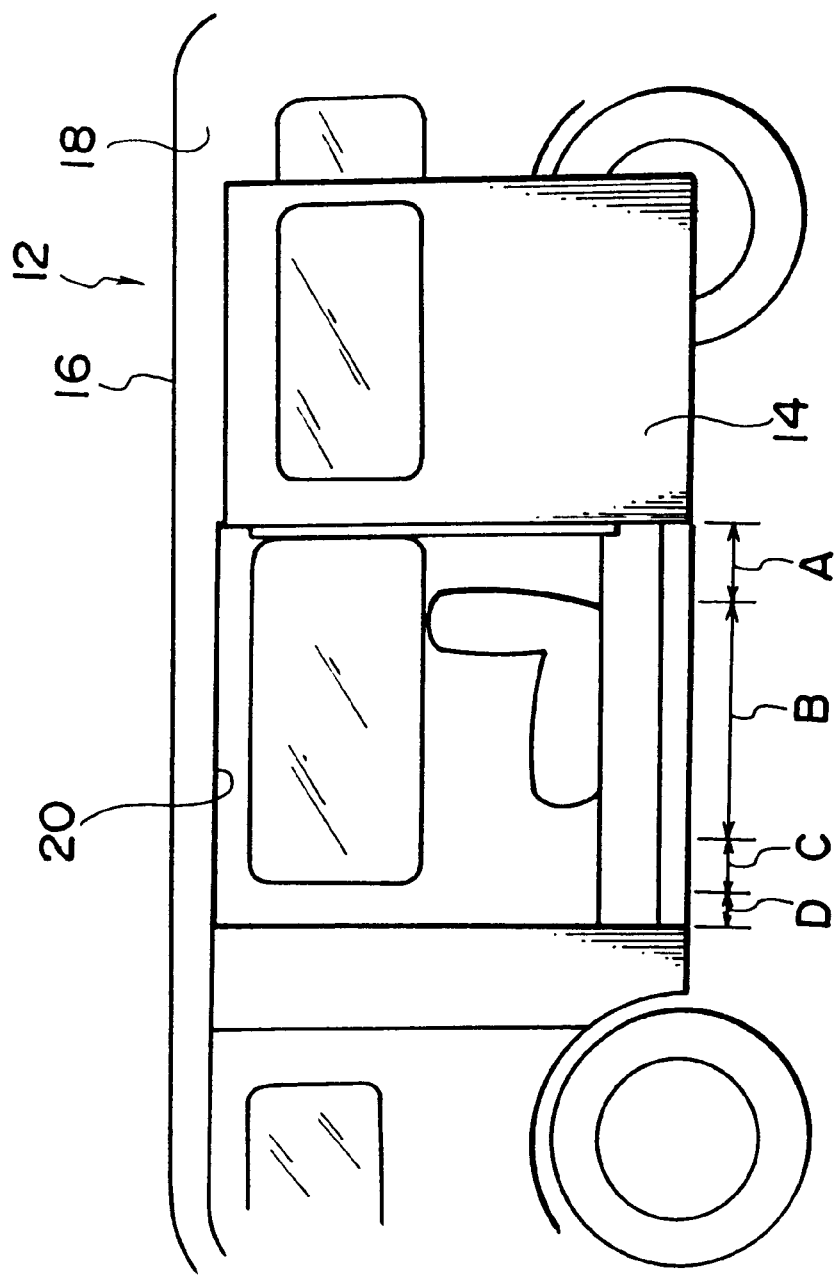
FIG. 3 is a side elevational view of a vehicle illustrating positions A to D in FIG. 1.

Here, when the closing drive of the slide motor 88 (i.e., drive for moving the door panel 14 in the forward direction of the vehicle 12) with the door panel 14 fully closed is started, if the computer 36 calculates on the basis of the count value of the pulse counter 106 the state in which the door panel 14 has begun to move while accelerating in the closing direction (i.e., in the forward direction of the vehicle 12), i.e., the fact that the front end portion of the door panel 14 is located in the acceleration region A in FIG. 3, then a signal is outputted from a signal generator (not shown) in the computer 36, and is inputted to the AND gate 120, as shown in FIG. 1.

At this time, if the protector 80 of the pressure sensitive sensor 60 which moves together with the door panel 14 presses a foreign object located on the moving path of the door panel 14, and if the protector 80 and the outer covering portion 62 are elastically deformed by the reaction force of pressing and the electrodes 66 or 70 and the electrodes 68 or 72 are brought into contact with each other and are shortcircuited (i.e., assume a "state of being pressed" stated before), then the current flowing across the circuit increases, and a signal is outputted from the current detecting element 78, as described above. This signal is also inputted to the AND gate 120. In addition, in this state, since the operation switch 52 has been naturally operated to effect the closing operation of the door panel 14, a signal is also outputted from the signal generator connected to the operation switch 52, and is inputted to the AND gate 120. When these three signals are inputted to the AND gate 120, a signal is outputted from the AND gate 120, and is inputted to the OR gate 128. The OR gate 128 outputs a signal if a signal is inputted thereto from one of the AND gates 120, 122, and 124.

The signal outputted from the OR gate 128 is inputted to the OR gate 130. This OR gate 130 outputs a signal when the signal from the OR gate 128 or a reversing signal from the closer driver 58 is inputted thereto. The signal outputted from the OR gate 130 is inputted to the slide driver 38, which reversely drives the slide motor 88 (i.e., effects opening drive) upon receiving the signal outputted from the OR gate 130. As a result, since the door panel 14 is slid in the opening direction (i.e., in the rearward direction of the vehicle 12), it is possible to prevent the nipping of a foreign object by the door panel 14.

Then, when the moving speed of the door panel 14 becomes fixed, and if the computer 36 calculates on the basis of the count value of the pulse counter 106 that the front end portion of the door panel 14 is located in the fixed-speed region B in FIG. 3, a signal is outputted from the signal generator (not shown) in the computer 36, and is inputted to the AND gate 122.

At this time, in the same way as when the front end portion of the door panel 14 is located in the acceleration region A, if the protector 80 and the outer covering portion 62 are elastically deformed by the reaction force of pressing by a foreign object and the electrodes 66 or 70 and the electrodes 68 or 72 are brought into contact with each other and are shortcircuited, a signal is outputted from the current detecting element 78.

In addition, at this time, when the foreign object located on the moving path of the door panel 14 hampers the movement of the door panel 14, and if the number of revolutions of the slide motor 88 declines, the period of conduction between the contact plates 100 and 102 becomes long, and the count value per unit time in the pulse counter per unit time becomes small. The speed-change detecting element 108 detects a change in the conduction period, and outputs a signal.

Both of the signals outputted from the current detecting element 78 and the speed-change detecting element 108 are inputted to the OR gate 132. If at least one of the signals outputted from the current detecting element 78 and the speed-change detecting element 108 is inputted to the OR gate 132, the OR gate 132 outputs a signal. The signal outputted from the OR gate 132 is also inputted to the AND gate 122.

In addition, at this time, since the operation switch 52 has been naturally operated to effect the closing operation of the door panel 14, a signal is also outputted from the signal generator connected to the operation switch 52, and is inputted to the AND gate 122. When these three signals are inputted to the AND gate 122, a signal is outputted from the AND gate 122, and is inputted to the OR gate 128. Upon receiving the signal from the AND gate 122, the OR gate 128 outputs a signal, and this signal is inputted to the OR gate 130. Further, upon receiving the signal, the OR gate 130 outputs a signal, and the slide driver 38, upon receiving the signal outputted from the OR gate 130, reversely drives the slide motor 88. As a result, since the door panel 14 is slid in the opening direction (i.e., in the rearward direction of the vehicle 12), it is possible to prevent the nipping of a foreign object by the door panel 14.

Then, when the movement in the closing direction of the door panel 14 by the slide motor 88 reaches the state immediately before its termination, and the moving speed of the door panel 14 is decelerated, and if the computer 36 calculates on the basis of the count value of the pulse counter 106 that the front end portion of the door panel 14 is located in the deceleration region C in FIG. 3, a signal is outputted from the signal generator (not shown) in the computer 36, and is inputted to the AND gate 124.

At this time, in the same way as when the front end portion of the door panel 14 is located in each of the acceleration region A and the fixed-speed region B, if the protector 80 and the outer covering portion 62 are elastically deformed by the reaction force of pressing by a foreign object and the electrodes 66 or 70 and the electrodes 68 or 72 are brought into contact with each other and are shortcircuited, a signal is outputted from the current detecting element 78, and is inputted to the AND gate 124.

In addition, at this time, since the operation switch 52 has been naturally operated to effect the closing operation of the door panel 14, a signal is also outputted from the signal generator connected to the operation switch 52, and is inputted to the AND gate 124. When these three signals are inputted to the AND gate 124, a signal is outputted from the AND gate 124, and is inputted to the OR gate 128. Upon receiving the signal from the AND gate 124, the OR gate 128 outputs a signal, and this signal is inputted to the OR gate 130. Further, upon receiving the signal, the OR gate 130 outputs a signal, and the slide driver 38, upon receiving the signal outputted from the OR gate 130, reversely drives the slide motor 88. As a result, since the door panel 14 is slid in the opening direction (i.e., in the rearward direction of the vehicle 12), it is possible to prevent the nipping of a foreign object by the door panel 14.

Then, when the full closing of the door panel 14 is started by the driving force of the closer motor 59 of the closer actuator 56 as described above, and if the computer 36 calculates on the basis of the count value of the pulse counter 106 that the front end portion of the door panel 14 is located in the closer region D in FIG. 3, a signal is outputted from the signal generator (not shown) in the computer 36, and is inputted to the AND gate 126.

At this time, in the same way as when the front end portion of the door panel 14 is located in each of the regions A to C, if the protector 80 and the outer covering portion 62 are elastically deformed by the reaction force of pressing by a foreign object and the electrode 66 or 70 and the electrode 68 or 72 are brought into contact with each other and are shortcircuited, a signal is outputted from the current detecting element 78, and is inputted to the AND gate 126.

In addition, at this time, since the operation switch 52 has been naturally operated to effect the closing operation of the door panel 14, a signal is also outputted from the signal generator connected to the operation switch 52, and is inputted to the AND gate 126.

When these three signals are inputted to the AND gate 126, a signal is outputted from the AND gate 126, and is inputted to the closer driver 58. Upon receiving the signal from the AND gate 126, the closer driver 58 reversely drives the closer motor 59 to return the lock mechanism such as the latch to a state similar to the state in which the door panel 14 is fully opened, and a signal is outputted from the closer driver 58. The signal outputted from the closer driver 58 is inputted to the OR gate 130. Further, the OR gate 130 outputs a signal, and the slide driver 38, upon receiving the signal outputted from the OR gate 130, reversely drives the slide motor 88. Hence, the door panel 14 is slid in the opening direction (i.e., in the rearward direction of the vehicle 12), thereby making it possible to prevent the nipping of a foreign object by the door panel 14.

Here, as described above, in this sliding door apparatus 10, the reverse driving of the slide motor 88 upon detection of a decline in the number of revolutions of the slide motor 88 (i.e., a decline in the speed of the slide motor 88) takes place only in the fixed-speed region B in FIG. 3. Namely, for example, since the acceleration region A and the deceleration region C are regions where the sliding velocity of the door panel 14 is being accelerated or decelerated, as compared with the state in which the door panel 14 is located in the fixed-speed region B, the sliding velocity of the door panel 14 is naturally slower, and the number of revolutions of the slide motor 88 is also small. Accordingly, in the case where the door panel 14 is located in the acceleration region A and the deceleration region C, a signal may be outputted from the speed-change detecting element 108. In this automatic sliding door apparatus 10, however, in cases where the front end portion of the door panel 14 is located in the acceleration region A and the deceleration region C, even if the speed-change detecting element 108 outputs a signal, the computer 36 ignores this signal. Accordingly, although there is no change in the reference value of the number of revolutions of the slide motor 88 for allowing the speed-change detecting element 108 to output a signal (i.e., the number of conductions per unit time of the contact plates 100 and 102), since the computer 36 ignores the signal outputted from the speed-change detecting element 108, even if the number of revolutions of the slide motor 88 declines, this decline is resultantly equivalent to the fact that the reference value of the number of revolutions of the slide motor 88 for allowing the speed-change detecting element 108 to output a signal is lowered to 0 or less so as not to output the signal (i.e., the computer 36 constituting the controlling means is the "reference-value changing means" referred to before). For this reason, the slide motor 88 is not reversely driven by a decline in the number of revolutions of the slide motor 88 during the acceleration and deceleration of the door panel 14, and it is possible to prevent the malfunction in which the slide door motor 88 is reversely driven in a state in which there is no foreign object.

Moreover, since acceleration and deceleration in the sliding velocity of the door panel 14 do not occur in the fixed-speed region B, the reference value of the number of revolutions of the slide motor 88 for allowing the speed-change detecting element 108 to output a signal can be set to a small value. Accordingly, in this state, even if the door panel 14 which is sliding is not stopped, it is possible to detect a foreign object which might constitute a hindrance to the sliding of the door panel 14. Furthermore, in this fixed-speed region B, since the detection of the foreign object is effected by pressure detection by the pressure sensitive sensor 60 and the detection of a decline in the speed of the slide motor 88, it is possible to detect even a foreign object which is difficult to detect in the detection of the decline in the speed of the slide motor 88 (e.g., a relatively thin and small foreign object) and a foreign object which is difficult to detect in the pressure detection by the pressure sensitive sensor 60 (e.g., an elongated foreign object and a foreign object whose planar pressure upon the pressure sensitive sensor 60 is low).

In addition, in the closer region D in FIG. 3, since the movement of the door panel 14 is taken over by the closer motor 59 from the slide motor 88, even if a foreign object is nipped in this state, the change in the speed of the slide motor 88 and the nipping of the foreign object basically cease to correspond to each other. However, since detection of a foreign object by the sensing of the reaction force of pressing by the pressure sensitive sensor 60 is effected in this automatic sliding door apparatus 10 as described above, it is possible to detect a foreign object in the closer region D.

Although the arrangement provided in the above-described embodiment is such that if the signal outputted from either the current detecting element 78 or the speed-change detecting element 108 in the fixed-speed region B in FIG. 3 is inputted to the OR gate 132, a signal is outputted from the OR gate 132, an arrangement may be provided such that the OR gate 132 is replaced by an AND gate, and a signal is not outputted from the AND gate (i.e., the slide motor 88 is not reversely rotated) unless the signals outputted from both the current detecting element 78 and the speed-change detecting element 108 are inputted to the AND gate.

For example, in a case where the door panel 14 is slid by causing the slide motor 88 to perform a closing drive in a state in which the vehicle 12 is stopped on a rearwardly slanting slope, even in the fixed-speed region B, gravity acts in such a manner as to hamper the movement of the door panel 14, so that a change in speed occurs in the slide motor 88. Meanwhile, in a case where the door panel 14 is slid by causing the slide motor 88 to undergo closing drive in a state in which the vehicle 12 is stopped on a forwardly slanting slope, even in the fixed-speed region B, gravity similarly acts in such a manner as to accelerate the movement of the door panel 14, so that a change in speed also occurs in the slide motor 88. With the above-described configuration, however, even if the speed of the slide motor 88 has changed and a signal is outputted from the speed-change detecting element 108, the slide motor 88 is not reversely driven unless the signal from the current detecting element 78 is outputted by detection of pressure by the pressure sensitive sensor 60. Therefore, it is possible to prevent the malfunction due to the effect of gravity.

In addition, although, in the above-described embodiment, the present invention is applied to the automatic sliding door apparatus 10 of the vehicle 12, it goes without saying that the automatic sliding door apparatus in accordance with the present invention is widely applicable to general opening/closing apparatuses including automatic doors other than the automatic sliding door apparatus 10 of the vehicle 12. In the case of a vehicle, the automatic sliding door apparatus in accordance with the present invention can be also applied as an apparatus for opening or closing a ceiling portion of the vehicle such as a sunroof or a moonroof, or can be applied to an automatic door of a building structure, a door of an elevator, a door of a railway vehicle, and so on.

Further, although, in the above-described embodiment, the pressure sensitive sensor 60 of a type in which the four electrodes 66, 68, 70, and 72 are helically provided inside the outer covering portion 62 is used as the pressure sensitive sensor, the pressure sensitive sensor is not limited to this arrangement, and it suffices if a sensor is used which is capable of detecting the presence of a foreign object through the reaction force of pressing from the foreign object.

Moreover, although, in the above-described embodiment, the arrangement in which the pulse voltage generated when the contact plates 100 and 102 are made conductive through the pulse plate 92 is provided as the arrangement of the position detecting means, the arrangement of the position detecting means is not limited to the same. For instance, an arrangement may be adopted such that a slit plate which rotates together with the gear 96 is interposed between a light-emitting element and a light-receiving element, and the amount of rotation of the slide motor 88 is calculated by counting the number of times when the light emitted from the light-emitting element passes through the slit in the rotating slit plate, and is received by the light-receiving element, so as to calculate the position of the door panel 14. Still alternatively, an arrangement may be adopted in which the position of the door panel 14 is detected directly by using a photoelectric sensor or the like.

What is claimed is:

1. An automatic opening/closing apparatus, comprising:
 a moving member for performing an opening/closing movement by receiving a driving force from a driving means;
 position detecting means for detecting the position of the moving member;
 load detecting means for detecting a load on the driving means if the movement of the moving member is restricted when the driving means is in a driving state;
 a pressure sensitive sensor located on the moving member for moving integrally with the moving member, and for detecting pressure applied to an end portion in the moving direction of the moving member;
 determining means for determining whether or not a state in which a load of a reference value or greater is detected by the load detecting means is an overloaded state and whether or not a state in which pressure of a reference value or greater is detected by the pressure sensitive sensor is a pressed state;
 controlling means for controlling the driving of the driving means if it is determined by the determining means that the state is at least one of the overloaded state and the pressed state; and
 reference-value changing means for changing at least either one of a reference value for determination of the overloaded state by the determining means and a reference value for determination of the pressed state by the determining means, in correspondence with a position of the moving member detected by the position detecting means;
 wherein the load detecting means does not detect the load on the driving means in correspondence with the position of the moving member detected by the position detecting means.

2. An automatic opening/closing apparatus according to claim 1, wherein if it is detected by the position detecting means that the moving member is located outside a predetermined region, the reference-value changing means raises the reference value for sensing the overloaded state.

3. An automatic opening/closing apparatus according to claim 2, wherein the range of the predetermined region is set to a range in which the moving member moves at a fixed velocity.

4. An automatic opening/closing apparatus according to claim 2, wherein the outside range of the predetermined region is defined as at least one of a range in which the moving member moves while accelerating and a range in which the moving member moves while decelerating.

5. An automatic opening/closing apparatus according to claim 1, wherein the controlling means can control the driving of the driving means by ignoring a determination by the determining means in correspondence with the position of the moving member detected by the position detecting means.

6. An automatic opening/closing apparatus according to claim 5, wherein if it is detected by the position detecting means that the moving member is located outside a predetermined region, the controlling means can control the driving of the driving means by ignoring a determination whether or not the overloaded state by the determining means.

7. An automatic opening/closing apparatus according to claim 6, wherein the range of the predetermined region is set to a range in which the moving member moves at a fixed velocity.

8. An automatic opening/closing apparatus according to claim 1, wherein if it is detected by the position detecting means that the moving member is located outside a predetermined region, the load detecting means do not detect the load on the driving means.

9. An automatic opening/closing apparatus according to claim 8, wherein the range of the predetermined region is set to a range in which the moving member moves at a fixed velocity.

10. An automatic opening/closing apparatus according to claim 1, wherein if it is determined by the determining means that the state is at least one of the overloaded state and the pressed state, the controlling means can control the driving means so as to at least stop or drive in reverse the driving means in correspondence with a position of the moving member detected by the position detecting means.

11. An automatic opening/closing apparatus according to claim 1, wherein the controlling means controls the driving of the driving means if it is determined by the determining means that the state is at least one of the overloaded state and the pressed state when the position of the moving member detected by the position detecting means is located in an predetermined region.

12. An automatic opening/closing apparatus according to claim 1, wherein the driving means is a motor and the position detecting means detects the position of the moving member in accordance with the amount of the rotation of the motor.

13. An automatic opening/closing apparatus according to claim 1, wherein the automatic opening/closing apparatus is a sliding door of a vehicle.

14. An automatic opening/closing apparatus according to claim 13, wherein the pressure sensitive sensor is disposed on an end portion of the sliding door in a closing direction thereof and along a vertical direction.

15. An automatic opening/closing apparatus according to claim 1, wherein the pressure sensitive sensor comprises a plurality of electrodes disposed helically at the sliding door along a vertical direction, wherein each electrode is formed from at least one elongated conductor.

16. An automatic opening/closing apparatus according to claim 15, wherein the electrodes are disposed in the pressure sensitive sensor in such a manner as to be spaced apart from each other.

17. An automatic opening/closing apparatus comprising:
   a moving member for performing an opening/closing movement by receiving a driving force from a driving means;
   position detecting means for detecting the position of the moving member;
   load detecting means for detecting a load applied to the driving means if the movement of the moving member is restricted when the driving means is in a driving state;
   a pressure sensitive sensor located on the moving member for moving integrally with the moving member, and for detecting pressure applied to an end portion in the moving direction of the moving member;
   determining means for determining whether or not a state in which a load of a reference value or greater is detected by the load sensing means is an overloaded state and whether or not a state in which pressure of a reference value or greater is detected by the pressure sensitive sensor is a pressed state; and
   controlling means for controlling the driving of the driving means if it is detected by the position detecting means that the moving member is located in a predetermined region and if it is determined by the determining means that the state is at least one of the overloaded state and the pressed state, and for controlling the driving of the driving means if it is detected by the position detecting means that the moving member is located outside a predetermined region and if it is determined by the determining means that the state is the pressed state;
   wherein the load detecting means does not detect the load on the driving means in correspondence with the position of the moving member detected by the position detecting means.

18. An automatic opening/closing apparatus according to claim 17, wherein the pressure sensitive sensor detects a pressure acting in a direction opposite to the moving direction of the moving member.

19. An automatic opening/closing apparatus according to claim 17, wherein the range of the predetermined region is set to a range in which the moving member moves at a fixed velocity.

20. An automatic opening/closing apparatus according to claim 17, wherein the controlling means controls the driving of the driving means if it is detected by the position detecting means that the moving member is located in a predetermined region and if it is determined by the determining means that the state is both the overloaded state and the pressed state.

21. An automatic opening/closing apparatus according to claim 19, wherein the controlling means controls the driving of the driving means so as to at least one of stop or drive in reverse the driving means if it is detected by the position detecting means that the moving member is located in a predetermined region and if it is determined by the determining means that the state is at least one of the overloaded state and the pressed state, or if it is detected by the position detecting means that the moving member is located outside a predetermined region and if it is determined by the determining means that the state is the pressed state.

22. An automatic opening/closing apparatus according to claim 17, wherein the controlling means controls the driving of the driving means so as to at least one of stop or drive in reverse the driving means if it is detected by the position detecting means that the moving member is located in a predetermined region and if it is determined by the determining means that the state is at least one of the overloaded state and the pressed state, or if it is detected by the position detecting means that the moving member is located outside a predetermined region and if it is determined by the determining means that the state is the pressed state.

23. An automatic opening/closing apparatus according to claim 17, wherein the driving means is a motor and the position detecting means detects the position of the moving member in accordance with the amount of the rotation of the motor.

24. An automatic opening/closing apparatus according to claim 17, wherein the outside range of the predetermined region is defined as at least one of a range in which the moving member moves while accelerating and a range in which the moving member moves while decelerating.

25. An automatic opening/closing apparatus according to claim 17, wherein the automatic opening/closing apparatus is a sliding door of a vehicle.

26. An automatic opening/closing apparatus according to claim 25, wherein the pressure sensitive sensor is disposed on an end portion of the sliding door in a closing direction thereof and along a vertical direction.

27. An automatic opening/closing apparatus according to claim 17, wherein the pressure sensitive sensor comprises a plurality of electrodes disposed helically at the sliding door along a vertical direction, wherein each electrode is formed from at least one elongated conductor.

28. An automatic opening/closing apparatus according to claim 27, wherein the electrodes are disposed in the pressure sensitive sensor in such a manner as to be spaced apart from each other.

* * * * *